United States Patent [19]

Szalwinski

[11] Patent Number: 6,049,803
[45] Date of Patent: Apr. 11, 2000

[54] DOCUMENTING SYSTEM FOR ENTITIES, ATTRIBUTES AND SCHEMA OF A RELATIONAL DATABASE

[75] Inventor: Bruce P. Szalwinski, Austin, Tex.

[73] Assignee: Advanced Micro Devices, Inc., Sunnyvale, Calif.

[21] Appl. No.: 08/920,364

[22] Filed: Aug. 29, 1997

[51] Int. Cl.[7] .................................................. G06F 17/30
[52] U.S. Cl. .......................................... 707/100; 707/104
[58] Field of Search ................................ 707/100, 2, 102, 707/3, 4, 104; 345/440, 113, 115, 118, 127, 336, 356

[56] References Cited

U.S. PATENT DOCUMENTS

| | | | |
|---|---|---|---|
| 5,426,781 | 6/1995 | Kaplan et al. | 707/4 |
| 5,428,776 | 6/1995 | Rothfield | 707/4 |
| 5,546,516 | 8/1996 | Austel et al. | 345/440 |
| 5,611,031 | 3/1997 | Hertzfeld et al. | 345/433 |
| 5,644,740 | 7/1997 | Kiuchi | 345/357 |
| 5,701,453 | 12/1997 | Maloney et al. | 707/2 |
| 5,713,020 | 1/1998 | Reiter et al. | 707/102 |

Primary Examiner—Anton W. Fetting
Assistant Examiner—Sanjiv Shah
Attorney, Agent, or Firm—Skjerven, Morrill, MacPherson, Franklin, & Friel, L.L.P.; Stephen A. Terrile

[57] ABSTRACT

A method is disclosed for interactive documentation of a database framework and data continued in a relational database, such as for example, an engineering database having data related to the manufacturing and testing of semiconductor devices. A plurality of documentation levels is provided wherein each documentation level includes a view of the database framework and wherein at least one documentation level includes a high level view of the database framework. The documentation levels include descriptions and definitions of the views of the database framework, and the views of the database framework include descriptions and definitions of entities, attributes and schema of the data in the database. One documentation level, from the plurality of documentation levels, is displayed including the view of the database framework. One or more user selectable items is displayed on the display device with each documentation level. The user selectable items represent other documentation levels or other views of the database framework and the other documentation levels are accessed by actuating one of the user selectable items. The documentation levels and the views of the database framework are based on one or more driving tables included in the database. The driving tables can be modified or updated thereby modifying or updating the documentation levels and the views of the database framework.

65 Claims, 17 Drawing Sheets

*Entity Relationship Diagrams*
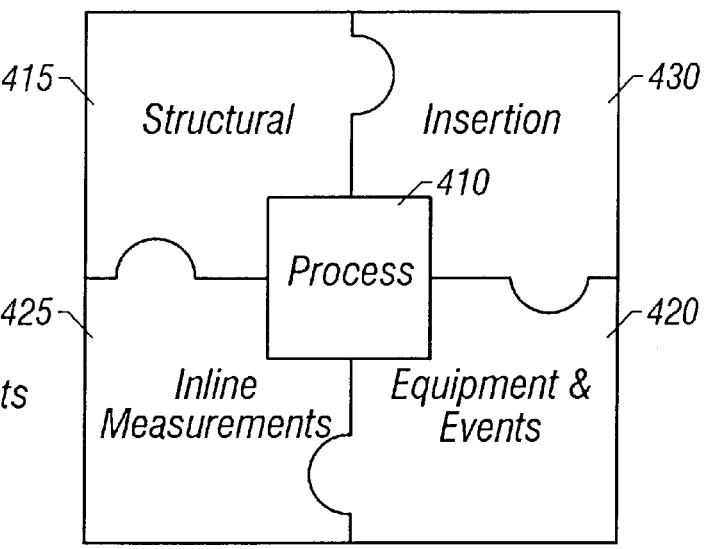
Process
Insertion
Equipment & Events
Inline Measurements
Structural
 Top   Tables   Columns   Views   Triggers   Search
405 — 435 — 440 — 445 — 450 — 455 — 460
*FIG. 4*

*Entity
Relationship
Diagrams* ─500  420─ Equipment & Events
This area of the model is defined as the components that contain equipment definitions, configurations, events (actions on a piece of equipment), components and event descriptions. ─515
Tables ─505
- Eqpt_Config ─530
  list of tables
Schema ─510
list of schema
     
Top    Tables    Columns    Views    Triggers    Search
─435   ─440   ─445   ─450   ─455   ─460
405─
*FIG. 5*

*Entity*
*Relationship* ← 800    430 — Insertion
*Diagrams*

This area of the model is defined as the components that contain the tester data and supporting information. Data contained here includes the lot, run, wafer and unit (site) level tester data as well as limit information and data related to the bining and test programs.
— 810

Lot Level — 820

Wafer Level — 825    ← 805

Run Level — 830

Unit Level — 835

     
Top      Tables    Columns    Views    Triggers    Search
 └435     └440      └445       └450     └455        └460
405 ⤴

FIG. 8

Table of Contents  ←80   450—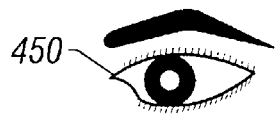
A
                list of views in alphabetical order
B
•
•
•  ←82
V —86
v_bin_eng_brl —88
•
•
•
Z
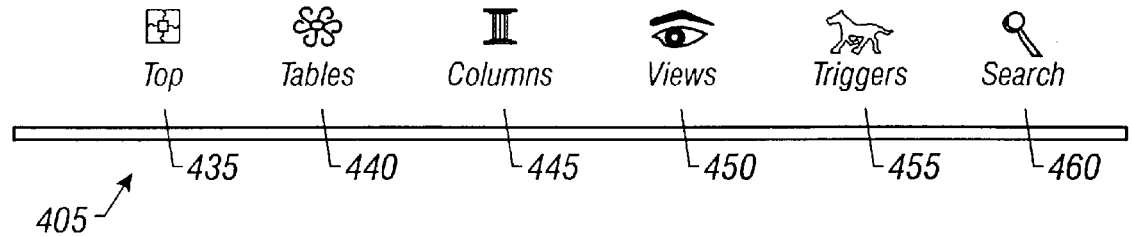
405
FIG. 16

DOCUMENTING SYSTEM FOR ENTITIES, ATTRIBUTES AND SCHEMA OF A RELATIONAL DATABASE

RESERVATION OF COPYRIGHT

A portion of the disclosure of this patent document contains material to which a claim of copyright protection is made. The copyright owner has no objection to the facsimile reproduction by anyone of the patent document or the patent disclosure, as it appears in the Patent and Trademark Office patent file or records, but reserves all other rights whatsoever.

BACKGROUND OF THE INVENTION

1. Field of the Invention

This invention relates to computerized relational database systems and, more particularly, this invention relates to a system for interactive documentation of a database framework including entities, attributes and schema of data in the database.

2. Description of the Related Art

All database management systems store and manipulate information. The relational approach to database management represents all information as "tables". A "database" is a collection of tables, each table having rows and columns. In a relational database, the rows of a table represent records (collections of information about separate items) and the columns represent fields (particular attributes of a record). In conducting searches, a relational database matches information from a field (column) in one table with information from a corresponding field (column) of another table to produce a third table that combines requested data from both tables.

All database management systems have some mechanism for getting at the information stored in a database. Such a mechanism involves specifying data retrieval operations, often called "queries", to search the database and then retrieve and display the requested information. However, in order to specify a query, a user must first understand the types of information available in the database, especially in a complex database framework, such as an engineering database. Typically, the user must have a thorough understanding of the database already or must spend considerable time learning, reviewing and documenting the descriptions and definitions of the information available in the database and the set-up of the database framework. Prior methods have included periodic printouts and distribution of database definitions, entities and attributes which is cumbersome and time consuming and which may not give the user the specific descriptions or definitions needed by the user.

Therefore, a method is needed for simple and interactive documentation and review of a relational database framework wherein each individual user can easily review the specific information needed. A documenting system is needed which also allows for efficient up-to-date modifications of the database framework information as the entities, attributes and schema of the database change.

SUMMARY OF THE INVENTION

A method is disclosed for interactive documentation of a database framework and data continued in a relational database, such as for example, an engineering database having data related to the manufacturing and testing of semiconductor devices. A plurality of documentation levels is provided wherein each documentation level includes a view of the database framework and wherein at least one documentation level includes a high level view of the database framework. One documentation level, from the plurality of documentation levels, is displayed including the view of the database framework. One or more user selectable items is displayed on the display device with each documentation level. The user selectable items represent other documentation levels or other views of the database framework and the other documentation levels are accessed by actuating one of the user selectable items.

The documentation levels include descriptions and definitions of the views of the database framework, and the views of the database framework include descriptions and definitions of entities, attributes and schema of the data in the database. The documentation levels and the views of the database framework are based on one or more driving tables included in the database. The driving tables can be modified or updated thereby modifying or updating the documentation levels and the views of the database framework.

The system of the present invention provides a simple and efficient method for interactively documenting a database framework including the entities, attributes and schema of the database. The simple interactive documentation method of the present invention allows a user to more easily construct a query to retrieve actual data from the database by allowing the user to review descriptions and definitions of the data and the database framework, and also allowing for modifications of the database framework information as the entities, attributes and schema of the database change.

BRIEF DESCRIPTION OF THE DRAWINGS

The present invention may be better understood, and its numerous objects, features, and advantages made apparent to those skilled in the art by referencing the accompanying drawings.

FIG. 4 is a plan view illustrating a top level view of an engineering database framework in accordance with a preferred embodiment of the present invention;

FIG. 5 is a plan view illustrating a documentation level including the Equipment and Events View from the top level view of the engineering database framework of FIG. 4;

FIG. 8 is a plan view illustrating a documentation level including the Insertion View from the top level view of the engineering database framework of FIG. 4 including a list of sub-level views of the Insertion View;

FIG. 16 is a plan view illustrating a documentation level including all of the views of the engineering database framework from the top level view of the engineering database framework of FIG. 4.

The use of the same reference symbols in different drawings indicates similar or identical items.

DESCRIPTION OF THE PREFERRED EMBODIMENTS

Figure 1:
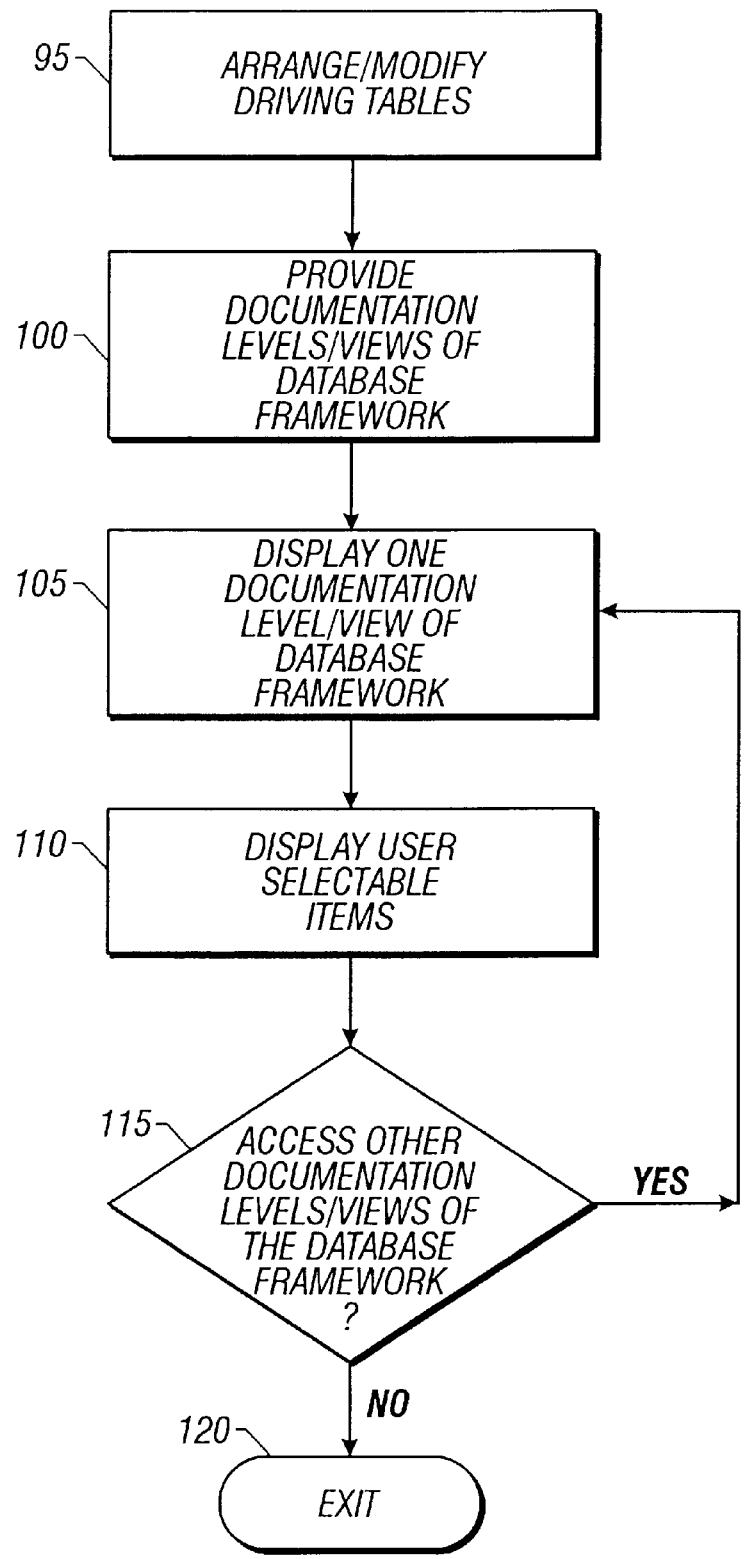
FIG. 1 is a flowchart illustrating the method of the present invention.

The flowchart of FIG. 1 illustrates the method of the present invention for interactive documentation of a database framework and data continued in a relational database. The database is, for example, in a computer system having a processing unit coupled to a display device. One or more driving tables are arranged in the database, for instance, by an administrator per block 95. The term "administrator" as used herein, refers to a computer engineer or the like who manages or updates computerized database systems. A plurality of documentation levels is provided per block 100 wherein each documentation level includes views of the database framework. The documentation levels and the views of the database framework are based on the driving tables arranged at block 95. The driving tables in the database are also, for example, modified or updated by the administrator per block 95, wherein the documentation levels and the views of the database framework are thereby modified or updated.

At block 105, one of the documentation levels, including the view of the database framework for that documentation level, is displayed, for example, on the display device. Also displayed with each documentation level, per block 110, are one or more user selectable items. The user selectable items represent other documentation levels or other views of the database framework.

At decision block 115, a selection is made to access another documentation level or view of the database framework, or to exit the documentation method of the present invention at block 120. To access another documentation level or another view of the database framework, a user selectable item is actuated. If another documentation level is accessed, the method returns to block 105 wherein the documentation level or view of the database framework represented by the actuated user selectable item is displayed. If a user selectable item is not actuated, then the documentation system can be exited per block 120.

The documentation levels include descriptions and definitions of the views of the database framework, and the views of the database framework include descriptions and definitions of entities, attributes and schema of the data in the database. The entities of the data in the database describe the type of data that exists in the database whereas the attributes of the data in the database describe the inherent characteristics of the type of data and the relationship of the data as stored in tables and columns within the database. The schema of the database describes the pattern of the data of the database framework.

The relational database system as disclosed herein is, for example, composed of various distributed elements connected together by a common network, such as, any of many known computer system networks which may be accessed via telephone link, microwave relay, satellite link or the like and provides a data link throughout the world or may comprise a network more limited in scope. The display device may, for example, be remotely connected to the processing unit via a network and may take the form of a graphical user interface (GUI) program which allows access to the database system as provided in an IBM™ compatible personal computer, an Apple™ MacIntosh™ computer, or UNIX™ Workstation coupled to the computer system network.

Figure 2:
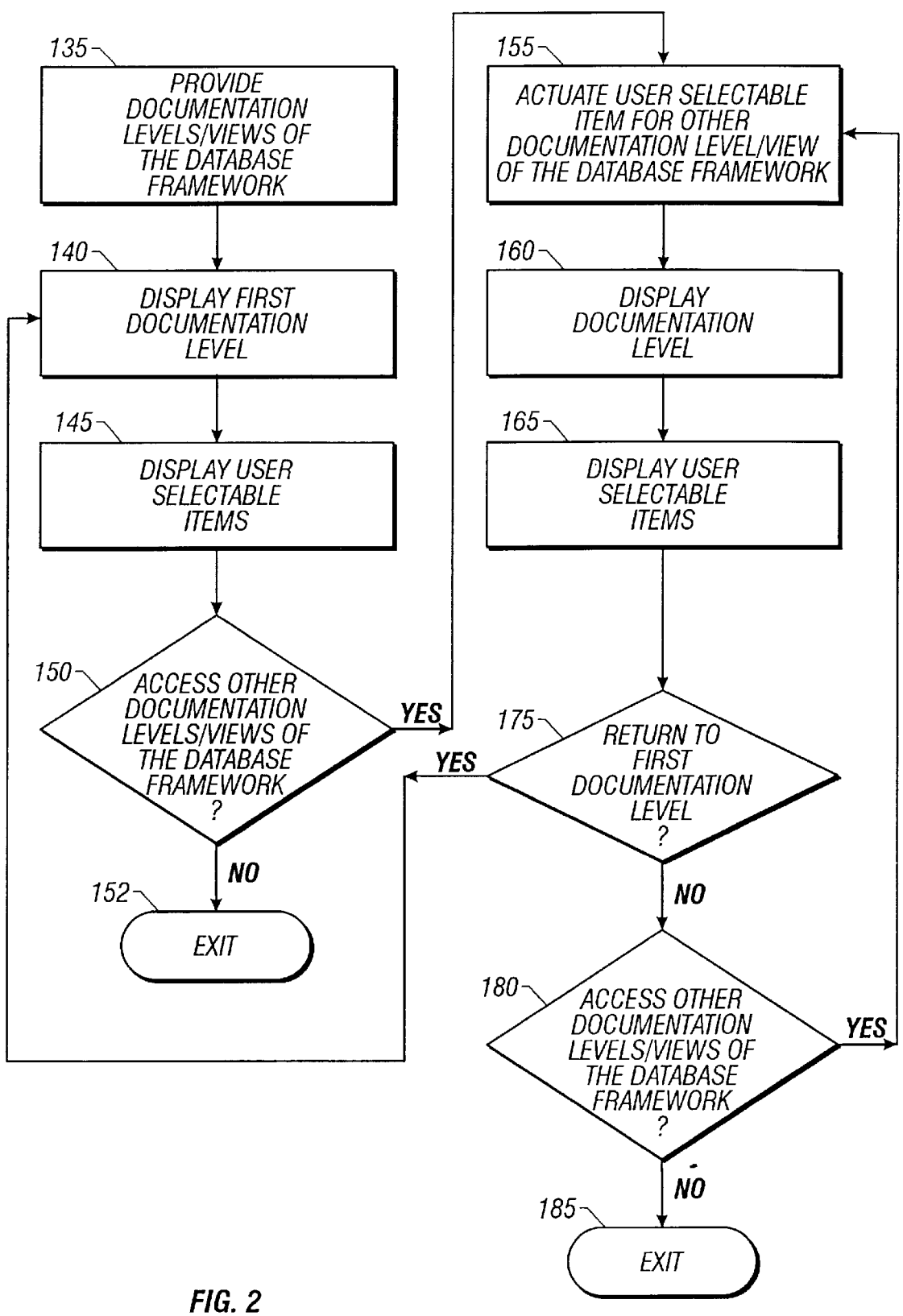
FIG. 2 is a flowchart further illustrating the method of the present invention as implemented by a user.

The flowchart of FIG. 2 illustrates the method of the present invention for interactive documentation of a database framework for a relational database as implemented by a user. The term "user" as used herein, refers to a production engineer or the like using information in a computerized relational engineering database system. The method of the present invention allows interactive documentation by the user of the database framework and descriptions of the data in the relational engineering database. The term "documentation" as used herein refers to the dissemination and reviewing of recorded information wherein the user interactively documents or reviews descriptions of information available in the database or the database framework in order to understand the database to, for example, formulate queries for retrieving actual data from the database.

The method of the present invention, as implemented by the user, begins at block 135 wherein the plurality of documentation levels is provided, each documentation level including a view of the database framework. For example, a first documentation level, which includes a top level view of the database framework, is accessed and displayed per block 140. One or more user-selectable items are also displayed with each documentation level including the first documentation level per block 145.

The user selectable items represent other documentation levels or other views of the database framework and are displayed, for example, as text or icons describing other documentation levels or views of the database framework. For example, the descriptions and definitions of the views of the database framework as well as the descriptions and definitions of the entities, the attributes and the schema of the data in the database are user selectable items which, when actuated, access the documentation level further describing the description or definition selected. Other user selectable items represent, for example, trigger procedures within the database or a search function, wherein the trigger procedures are implicitly executed sets of code executed by the processing unit when a particular statement is input from the user and the search function searches and displays key words or phrases input from the user and occurring anywhere in the database framework. Still another user selectable item represents a step back function where the user returns to a previously displayed documentation level from a currently displayed documentation level.

The user selectable item is selected and actuated, for instance, by the user to access the functions or documentation levels or views of the database framework represented by the user selectable item. When the computer system includes a graphical user interface some of the user selectable items are displayed, for instance, as icons. For example, the first documentation level is displayed as a puzzle metaphor wherein each puzzle piece is a user selectable item representing a high level view of the database framework. The description of a particular view of the database framework is accessed by actuating one of the puzzle pieces representing that particular view of the database framework.

At decision block 150, the user determines whether to access another documentation level or another view of the database framework included in another documentation level, or the user exits the documentation system per block 152. However, for discussion purposes, it is assumed that the user desires to access another documentation level or view of the database framework and, at block 155, the user actuates one of the user-selectable items representing another documentation level or representing another view of the database framework The documentation level or view of the database framework selected is displayed per block 160 for review by the user. The user selectable items are also displayed with the documentation level per block 165.

The option to return to the first documentation level from any other documentation level is available per decision block 175, by actuating, for example, a user-selectable item representing the first documentation level. Per block 180, the user continues to access other documentation levels or views of the database framework as desired or exits the documentation system per block 185. However, if the user desires to continue accessing other documentation levels, the method returns to block 155 and the user, for example, again actuates a user selectable item representing the desired documentation level or view of the database framework.

Figure 3:
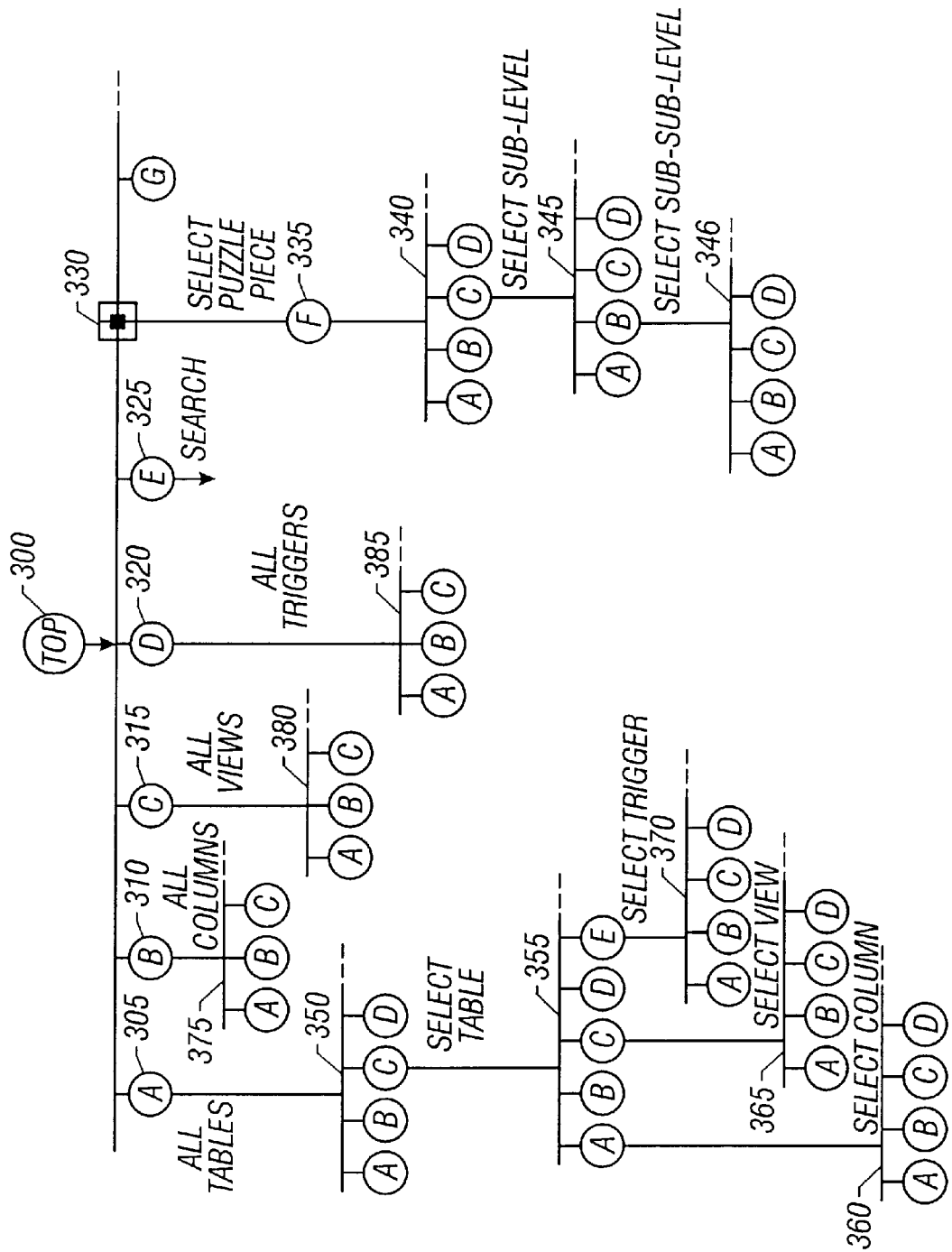
FIG. 3 is a logic flow diagram illustrating examples of the flow between various documentation levels and views of a relational database framework.

FIG. 3 is a logic flow diagram illustrating an embodiment of the method of the present invention wherein examples of the flow and linking between various documentation levels and views of a relational database framework are shown. User selectable items are described representing various documentation levels and views of a database framework. The logic flow is diagrammatically illustrated including examples of accessing one documentation level from another documentation level. However, the following examples of logic flow and links from one documentation level to another are not exclusive and are set forth for example only, as a user may interactively flow from any one documentation level to any other documentation level in a variety of links, both to more detailed documentation levels and to broader documentation levels.

The first documentation level 300 includes a top level view of the database framework. The user selectable items displayed with each documentation level are actuated to access other documentation levels or views of the database framework. Some of the user selectable items illustrated in FIG. 3 are, for example, a "Tables" item 305, a "Columns" item 310, a "Views" item 315, a "Trigger" item 320, and a "Search" item 325. The Table item 305 represents a view of all tables in the database including definitions and descriptions of the data contained in the tables in the database and the structure of the tables. The Column item 310 represents a view of all columns in the tables in the database including definitions and descriptions of data contained in and the relationship between the columns. The Views item 315 represents definitions and descriptions of all the views of the database framework including tailored presentations of descriptions of the data contained on one or more tables in the database. The Trigger item 320 represents trigger procedures for the database, and the Search item 325 represents a search function for key words and phrases in the database.

The examples of user selectable items in FIG. 3 are not meant to be exclusive. For example, the descriptions and definitions of the views of the database framework as well as the descriptions and definitions of the entities, the attributes and the schema of the data in the database are user selectable items which, when actuated, access the documentation level further describing the description or definition selected. The user selectable items can represent any documentation level or view of the database framework of interest, such as, for example, a user selectable item to return the user to the first documentation level from any other documentation level, or a user selectable item combining certain views of the database framework or documentation levels. The user selectable items are actuated from any documentation level to display the information of interest to the user.

When the first documentation level 300 is accessed, a puzzle metaphor 330 is, for example, displayed on the display device wherein each puzzle piece 335 of the puzzle metaphor 330 is a user selectable item representing a particular high level view of the database framework. For example, actuating a puzzle piece 335 accesses another documentation level 340 wherein a description of the high level view of the database framework represented by the selected puzzle piece 335 is displayed, either textually, graphically or both, such as an entity relationship diagram or a written definition of the view of the database framework (described in more detail in the preceding figures). The documentation level 340 may also include additional layers such as sub-level views 345 and sub-sub-level views 346 of the database framework. The sub-level views are accessed, for example, by selecting and actuating a displayed definition or description representing the sub-level view 345 on the documentation level 340.

Other documentation levels or views of the database framework are accessed by actuating one of the other user selectable items described herein. For instance, another documentation flow illustrated accesses a documentation level 350 including the descriptions, definitions and relationships of all of the tables included in the database framework. The Tables item 305 is actuated to display the documentation level 350 illustrating all of the tables for the database framework. A specific table is then selected and actuated from documentation level 350 to access documentation level 355 wherein definitions and descriptions of the selected table are displayed. The descriptions of the selected table include, for example, descriptions of the columns located within the table, indexes including fast access paths to the table data, a listing of all views of the database framework which include the selected table, and trigger procedures associated with the selected table.

Documentation level 360 is accessed, for instance, by selecting and actuating a specific column from the documentation level 355. Documentation level 360 includes a definition of the selected column and descriptions of the selected column including descriptions of all tables in which the column is located and details of the types of data and length of data within the selected column. Another option at the documentation level 355 is selecting and actuating the definition of the selected table to access documentation level 365 wherein a tailored presentation of the data contained in the table is displayed. A particular trigger procedure may also be selected and actuated to access documentation level 370 wherein descriptions and definitions of the selected trigger procedure is displayed.

Another option at the documentation level 300 or at any documentation level, is for the user to actuate the user selectable items, such as the Columns item 310, the Views item 315, the Trigger item 320 or the Search item 325. For instance, actuating the Columns item 310 accesses documentation level 375 and displays descriptions and definitions of all of the columns contained in all the tables in the database framework. Actuating the Views item 315 accesses documentation level 380 and displays descriptions and definitions of all of the views of the database framework Documentation level 385 is accessed by actuating the Trigger item 320 which displays descriptions and definitions of all the trigger procedures associated with the database. Actuating the Search item 325 from documentation level 300 activates a search function wherein the user can search the database framework and data descriptions and definitions for particular key words or phrases and wherein all instances of the occurrence in the database of the key word or phrase are displayed.

Referring to FIG. 4, a high level view of a relational engineering database framework is illustrated in accordance with a preferred embodiment of the present invention. The data in the engineering database relates to the manufacturing and testing of semiconductor devices for purposes of this illustration, however, the data may be of any type that is typically used in a relational database. The high level view illustrated in FIG. 4 is a top level view 400 of the database framework and includes a plurality of user selectable items 405 representing other high level views of the documentation levels or views of the database framework. The documentation levels as discussed herein include descriptions and definitions of the views of the relational engineering database framework, for example, listings of the tables and columns in the database framework and descriptions of the relationships between the various tables, columns and views of the database framework. The views of the database framework also include descriptions and definitions of the entities, the attributes and the schema of the data in the relational engineering database.

When the computer system includes a graphical user interface, the first documentation level including the top level view of the database framework is illustrated, for example, as a puzzle metaphor wherein each puzzle piece is a user selectable item representing another high level view of the engineering database framework. A description of a particular high level view of the engineering database framework is accessed by selecting and actuating the puzzle pieces representing that particular high level view of the engineering database framework. The views of the database framework are displayed, for example, as schematics, drawings, pictures, or written descriptions of the database framework illustrating the entity relationships.

The first documentation level 400 of the engineering database illustrated in FIG. 4 includes five puzzle pieces representing five high level views of the database framework, including a Process View 410, a Structural View 415, an Equipment and Events View 420, an Inline Measurements View 425, and an Insertion View 430. The Process View 410 includes definitions and descriptions of data through a particular semiconductor manufacturing facility from one or more shop floor execution systems and includes movement, loss comment, attribute and genealogy data descriptions. The Structural View 415 includes definitions and descriptions of one or more manufactured semiconductor products and the manufacturing steps and routes for each manufactured semiconductor product. The Equipment and Events View 420 includes definitions and descriptions of equipment, equipment configurations, equipment components, and equipment events. The Inline Measurements View 425 includes definitions and descriptions of inline measurements and supporting data including limits, parameters and groupings of parameters for analysis. The Insertion View 430 includes definitions and descriptions of tester data including lot level tester data, run level tester data, wafer level tester data, unit level tester data, limit data and data related to binning and test programs.

When the computer system includes a graphical user interface some user selectable items are displayed, for instance, as icons. Some of the user selectable items 405 illustrated in FIG. 4 and FIGS. 5 through 15 are, for example, a puzzle metaphor 435, a table metaphor 440, a column metaphor 445, an eye metaphor 450, a horse metaphor 455, and a magnifying glass metaphor 460. The puzzle metaphor 435 represents the top level view of the engineering database on the first documentation level 400. The table metaphor 440 represents the definitions, descriptions and relationships of all of the tables in the engineering database framework. The column metaphor 445 represents the definitions, descriptions and relationships of all of the columns located within all of the tables in the engineering database framework. The eye metaphor 450 represents the definitions and descriptions of all of the views of the engineering database framework including tailored presentations of the data contained in the tables in the engineering database framework. The horse metaphor 455 represents the definitions and descriptions of all of the trigger procedures and the magnifying glass metaphor 460 represents the search function.

FIG. 5 is a plan view illustrating a documentation level 500 including the Equipment and Events View 420 of the engineering database framework from documentation level 400 of FIG. 4. The documentation level 500 illustrated in FIG. 5 is accessed by selecting and actuating the Equipment and Events View 420 puzzle piece from the displayed documentation level 400 of FIG. 4. The Equipment and Events View 420 documentation level 500 illustrated includes a list of tables 505 having definitions and descriptions of equipment, equipment configurations, equipment components, and equipment events such as Eqpt_Config table 530, a schema list 510 describing formats of the data in the engineering database, and the definition 515 of the Equipment and Events View 420. The Eqpt_Config table 530 includes definitions and descriptions of data related to equipment configurations. The user selectable items 405 described previously are also displayed with the Equipment and Events View 420 documentation level 500.

Figure 6:
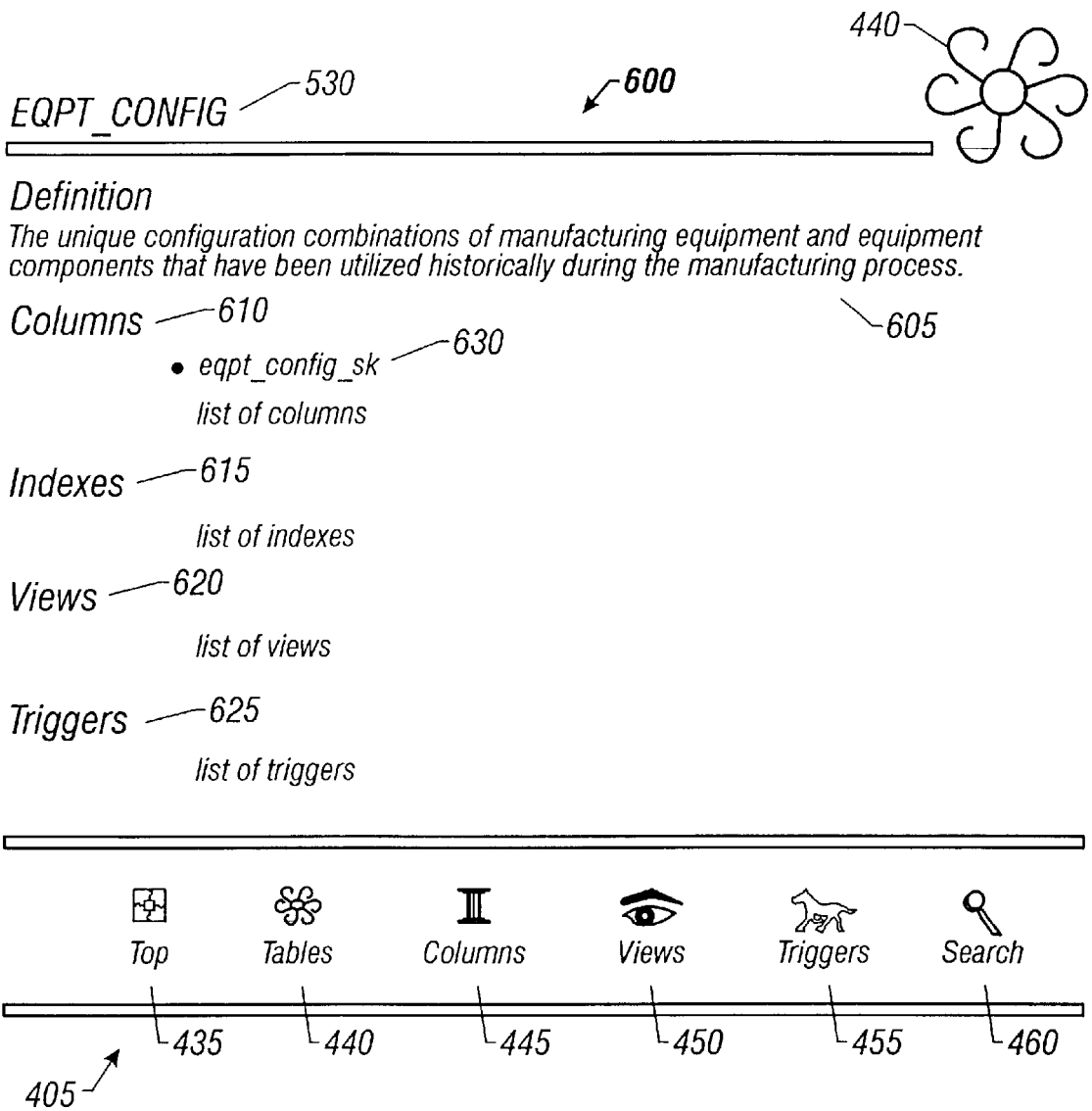
FIG. 6 is a plan view illustrating a documentation level including descriptions and definitions of a selected table from the Equipment and Events View of FIG. 5.

FIG. 6 is a plan view illustrating a documentation level 600 including descriptions and definitions of the selected table, the Eqpt_Config table 530, from the Equipment and Events View 420 on documentation level 500 of FIG. 5. The documentation level 600 illustrated in FIG. 6 is accessed by selecting and actuating the Eqpt_Config table 530 from the table listing 505 on documentation level 500 displayed in FIG. 5. The Eqpt_Config table 530 documentation level 600 illustrated includes the definition 605 of the Eqpt_Config table 530, a listing of columns 610 contained in the Eqpt_Config table 530 such as Eqpt_Conf_Surrogate Key ("Sk") column 630, a list of indexes 615 describing fast access paths to the data contained in the Eqpt_Config table 530, a list of the views 620 of the database framework that include the Eqpt_Config table 530, and a list of trigger procedures 625 associated with the Eqpt_Config table 530. The user selectable items 405 described previously are also displayed with documentation level 600.

Figure 7:
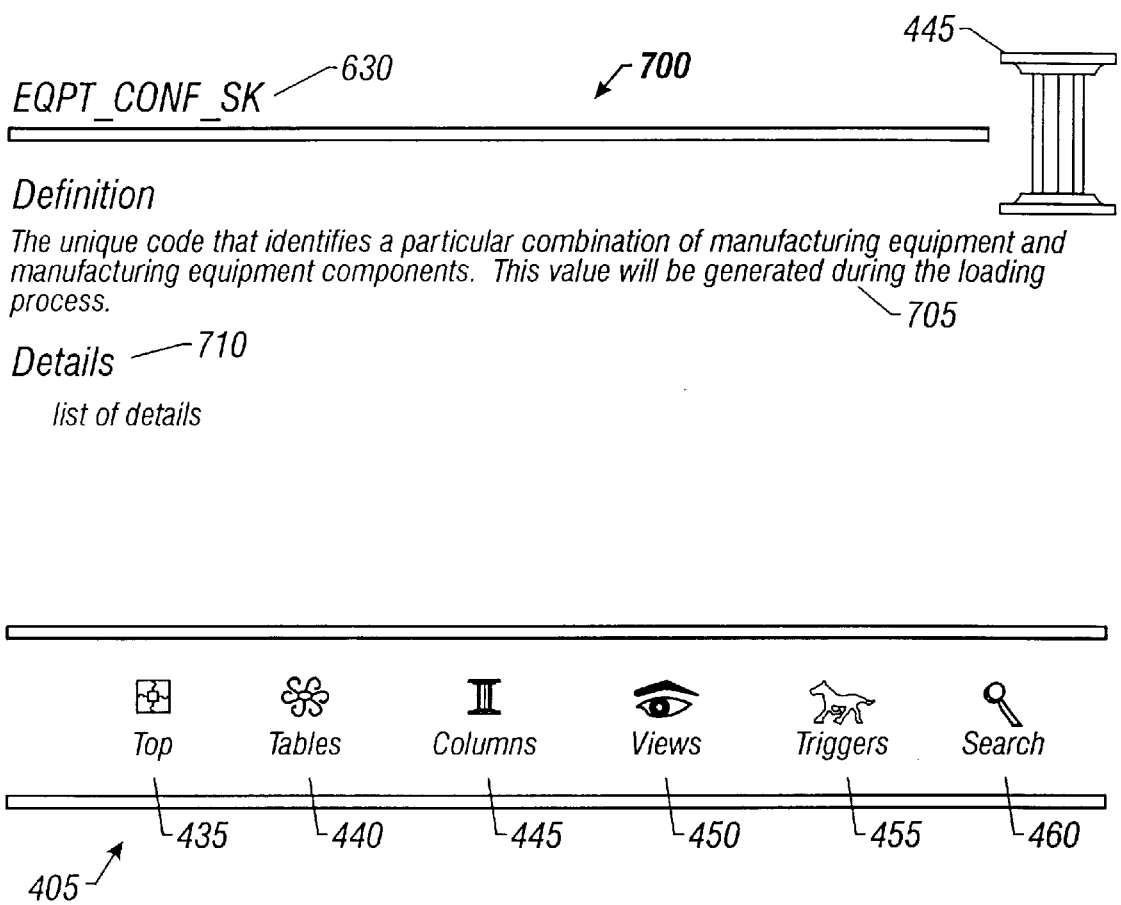
FIG. 7 is a plan view illustrating a documentation level including descriptions and definitions of a selected column from the table of FIG. 6.

FIG. 7 is a plan view illustrating a documentation level 700 including descriptions and definitions of the selected column, the Eqpt_Conf_sk column 630, from the Eqpt_Config table 530 on documentation level 600 of FIG. 6. The documentation level 700 illustrated in FIG. 7 is accessed by selecting and actuating the Eqpt_Conf_sk column 630 from the listings of columns 610 on documentation level 600 displayed in FIG. 6. The Eqpt_Conf_sk column 630 documentation level 700 illustrated includes the definition 705 of the Eqpt_Conf_sk column 630, and a details list 710 describing all of the tables in the database which contain the Eqpt_Conf_sk column 630. The user selectable items 405 described previously are also displayed with documentation level 700.

FIG. 8 is a plan view illustrating a documentation level 800 including the Insertion View 430 of the engineering database framework from documentation level 400 of FIG. 4. Documentation level 800 includes a list of sub-level views 805 of the Insertion View 430. The documentation level 800 illustrated in FIG. 8 is accessed by selecting and actuating the Insertion View 430 puzzle piece from the displayed documentation level of FIG. 4. The Insertion View 430 documentation level 800 illustrated includes the definition 810 of the Insertion View 430, and the list of sub-level views 805 of the Insertion View 430 including a Lot Level sub-level view 820, a Wafer Level sub-level view 825, a Run Level sub-level view 830, and a Unit Level sub-level view 835. The Lot Level sub-level view 820 includes descriptions and definitions of tables representing data contained in the unit level and summarized by test and bin. The Wafer Level sub-level 825 includes descriptions and definitions of tables related to wafer electrical testing and sorting data collection processes wherein the tables represent data from the unit level summarized by test and bin for each wafer. The Run Level sub-level 830 includes descriptions and definitions of tables related to backend data collection processes wherein the tables represent data from the unit level summarized by test and bin for each run. The Unit Level sub-level 835 includes descriptions and definitions of tables representing detailed parametric data, including individual results of a single test on a single unit and includes sub-sub-levels. The user selectable items 405 described previously are also displayed with the Insertion View 430 documentation level 800.

Figure 9:
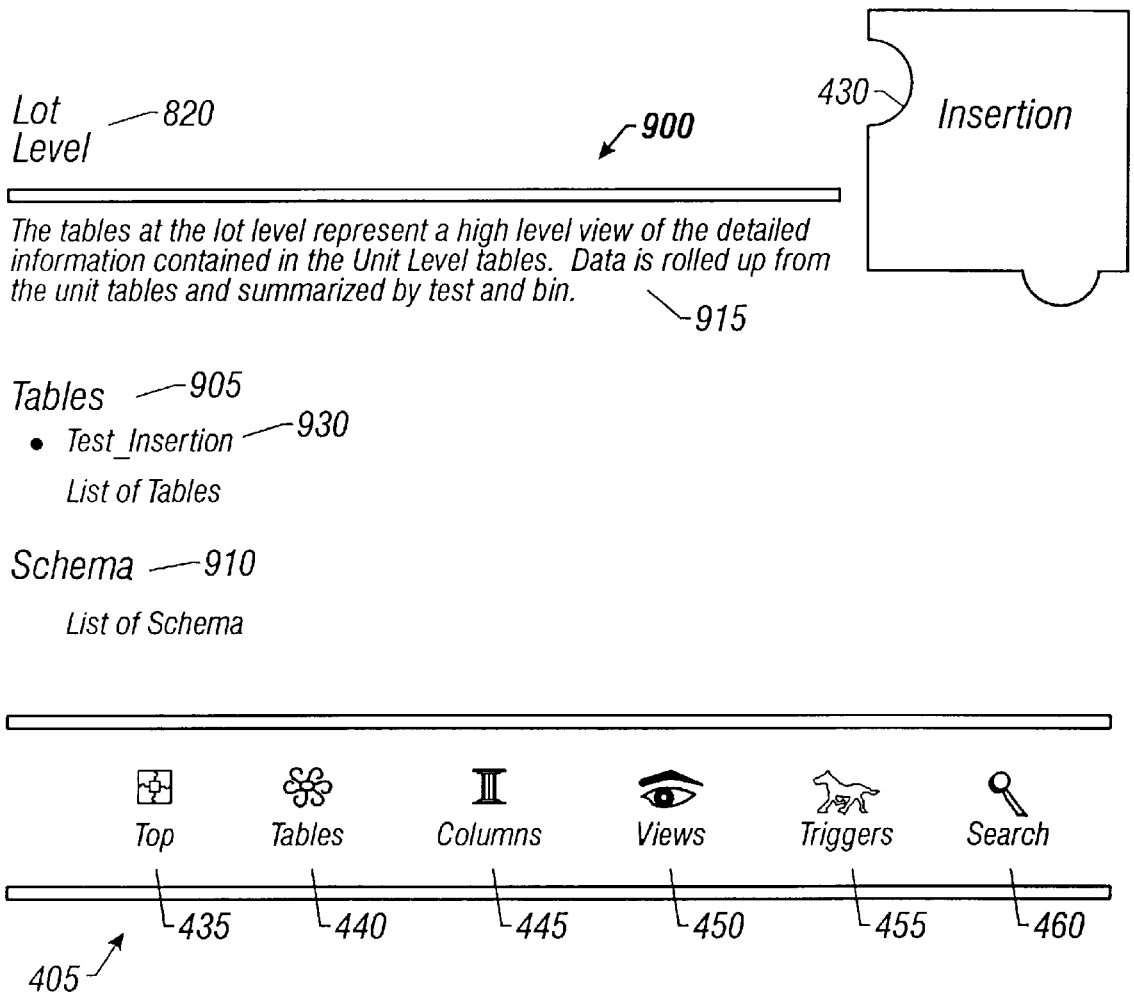
FIG. 9 is a plan view illustrating a documentation level including the Lot Level sub-level view from the Insertion View of FIG. 8.

FIG. 9 is a plan view illustrating a documentation level 900 including a view of the Lot Level sub-level view 820 from the Insertion View 430 and documentation level 800 of FIG. 8. The documentation level 900 illustrated in FIG. 9 is accessed by selecting and actuating the Lot Level sub-level view 820 from the displayed documentation level 800 of FIG. 8. The Lot Level sub-level view 820 documentation level 900 illustrated includes a list of tables 905 having definitions and descriptions of a high level view of the detailed data contained in the Unit Level sub-level level view 835 tables wherein the data is rolled up from unit tables and summarized by test and bin such as Test_Insertion table 930, a schema list 910 describing formats of the data in the engineering database, and the definition 915 of the Lot Level sub-level view 820. The Test_Insertion table 930 includes definitions and descriptions of data related to tester data. The user selectable items 405 described previously are also displayed with the documentation level 900.

Figure 10:
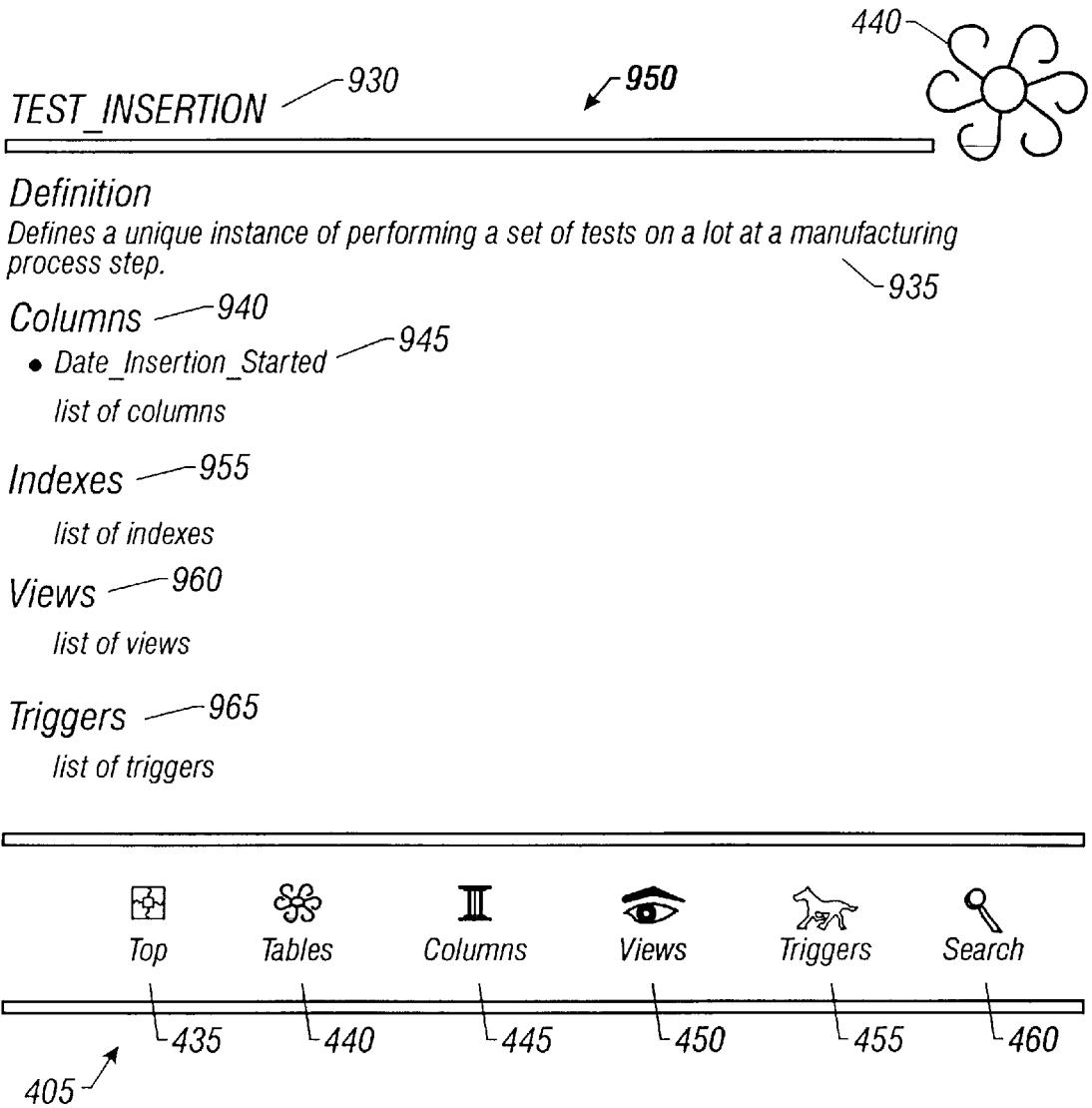
FIG. 10 is a plan view illustrating a documentation level including descriptions and definitions of a selected table from the Lot Level sub-level view of FIG. 9.

FIG. 10 is a plan view illustrating a documentation level 950 including descriptions and definitions of the selected table, the Test_Insertion table 930, from the Lot Level sub-level view 820 on documentation level 900 of FIG. 9. The documentation level 950 illustrated in FIG. 10 is accessed by selecting and actuating the Test_Insertion table 930 from the table listing 905 from the documentation level 900 displayed in FIG. 9. The Test_Insertion table 930 documentation level 950 illustrated includes the definition 935 of the Test_Insertion table 930, a list of columns 940 contained in the Test_Insertion table 930 such as Date-Insertion-Started column 945 related to testing date data, a list of indexes 955 describing fast access paths to the data contained in the Test_Insertion table 930, a list of the views 960 of the database framework that include the Test_Insertion table 930, and a list of trigger procedures 965 associated with the Test_Insertion table 930. The user selectable items 405 described previously are also displayed on documentation level 950.

Figure 11:
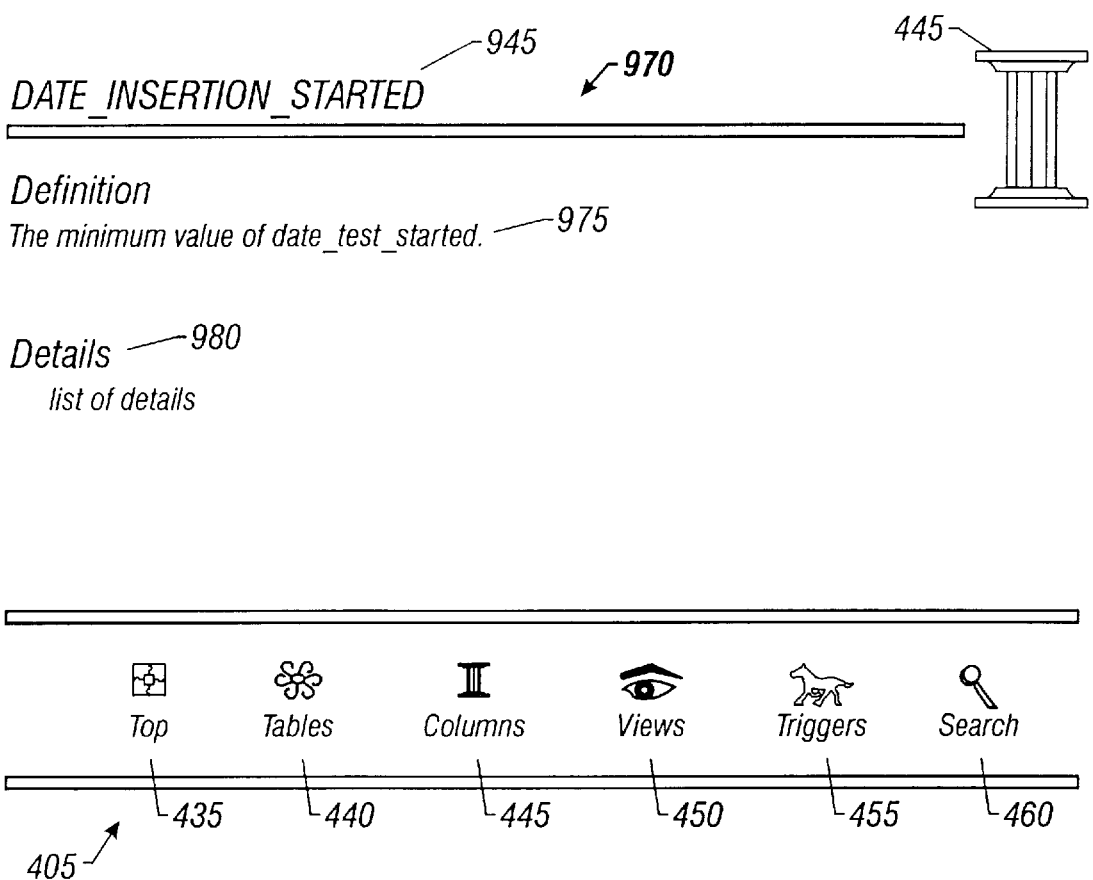
FIG. 11 is a plan view illustrating a documentation level including descriptions and definitions of a selected column from the table of FIG. 10.

FIG. 11 is a plan view illustrating a documentation level 970 including descriptions and definitions of the selected column, the Date-Insertion-Started column 945, from the Test_Insertion table 930 on documentation level 950 of FIG. 10. The documentation level 970 illustrated in FIG. 11 is accessed by selecting and actuating the Date-Insertion-Started column 945 from the list of columns 940 from the documentation level 950 displayed in FIG. 10. The Date-Insertion-Started column 945 documentation level 970 illustrated includes the definition 975 of the Date-Insertion-Started column 945, and a details list 980 describing all of the tables in the database which contain the Date-Insertion-Started column 945. The user selectable items 405 described previously are also displayed on documentation level 970.

Figure 12:
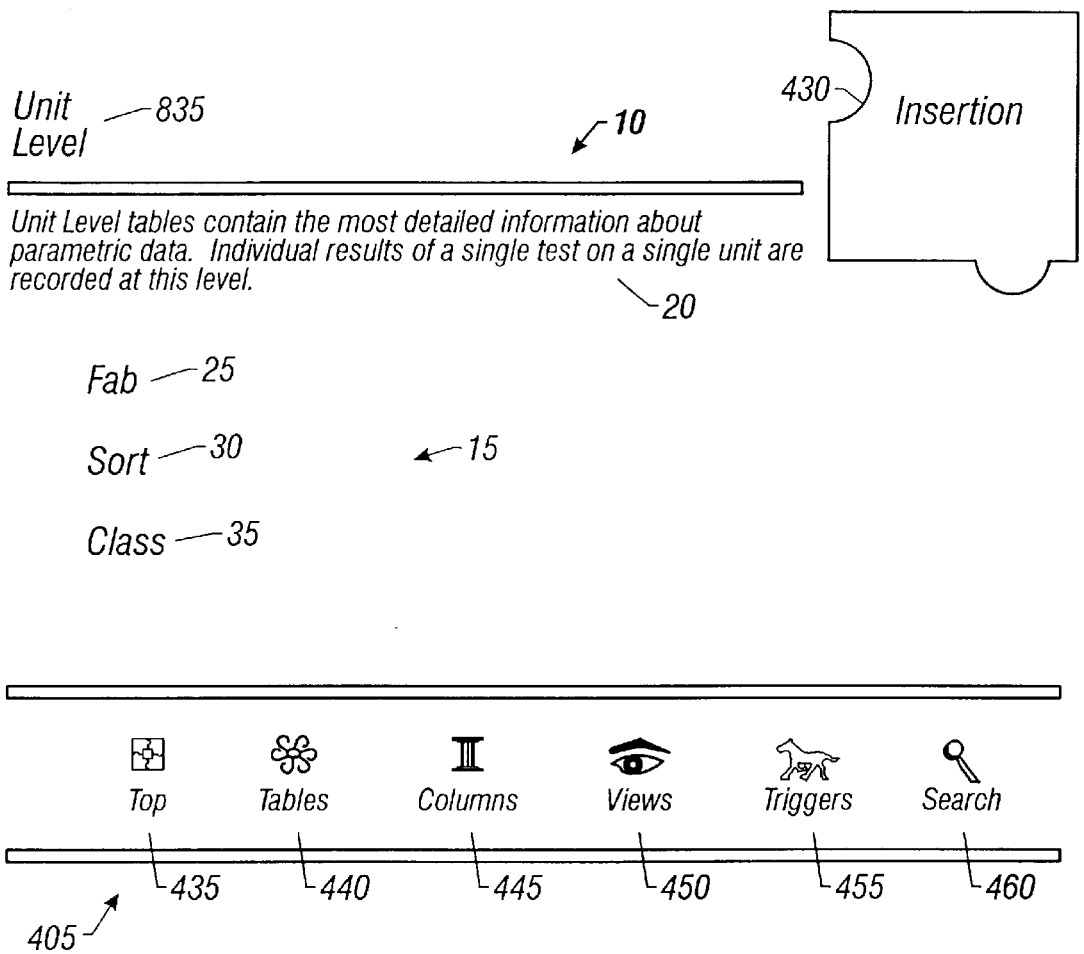
FIG. 12 is a plan view illustrating a documentation level including the Unit Level sub-level view from the Insertion View of FIG. 8 including a list of sub-sub-level views of the Unit Level sub-level view.

FIG. 12 is a plan view illustrating a documentation level 10 including a view of the Unit Level sub-level view 835 from the list of sub-level views 805 of the Insertion View 430 documentation level 800 of FIG. 8. A list of sub-sub-level views 15 of the Unit Level sub-level view 835 are displayed on documentation level 10. The documentation level 10 illustrated in FIG. 12 is accessed by selecting and actuating the Unit Level sub-level view 835 from the displayed documentation level 800 of FIG. 8. The Unit Level sub-level view 835 documentation level 10 illustrated includes the definition 20 of the Unit Level sub-level view 835, and the list of sub-sub-level views 15 of the Unit Level sub-level view 835 including a Unit Level Fab sub-sub-level view 25, a Unit Level Sort sub-sub-level view 30, and a Unit Level Class sub-sub-level view 35. The term "fab" relates to process data specific to a particular manufacturing facility, the term "sort" relates to process data and test data specific to a particular semiconductor product, and the term "class" relates to process data and test data specific to a particular packaged semiconductor device. The Unit Level Fab sub-sub-level view 25 includes definitions and descriptions of unit level data collected at a wafer electrical test step. The Unit Level Sort sub-sub-level view 30 includes definitions and descriptions of unit level data collected during a sorting of wafers. The Unit Level Class sub-sub-level view 35 includes definitions and descriptions of unit level data collected on assembled semiconductor parts. The user selectable items 405 described previously are also displayed with the documentation level 10.

Figure 13:
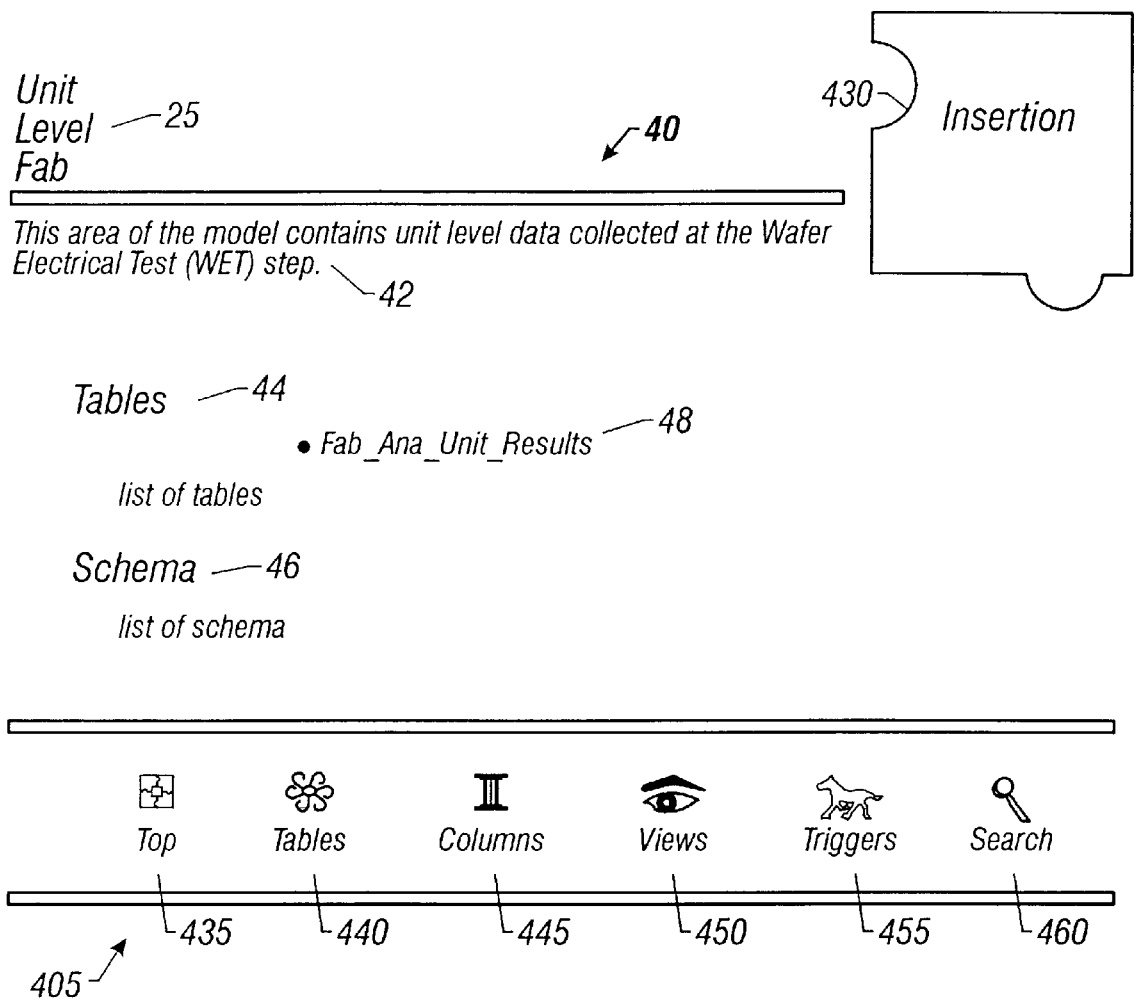
FIG. 13 is a plan view illustrating a documentation level including the Unit Level Fab sub-sub-level view from the Unit Level sub-level view of FIG. 12.

FIG. 13 is a plan view illustrating a documentation level 40 including the Unit Level Fab sub-sub-level view 25 from documentation level 10 of FIG. 12. The documentation level 40 illustrated in FIG. 13 is accessed by selecting and actuating the Unit Level Fab sub-sub-level view 25 from the displayed documentation level 10 of FIG. 12. The Unit Level Fab sub-sub-level view 25 documentation level 40 illustrated includes the definition 42 of the Unit Level Fab sub-sub-level view 25, a list of tables 44 having definitions and descriptions of unit level data collected at the wafer electrical test step such as Fab_Ana_Unit_Results table 48 which includes data related to fab analog test results, and a schema list 46 describing formats of the data in the engineering database. The user selectable items 405 described previously are also displayed with the documentation level 40.

Figure 14:
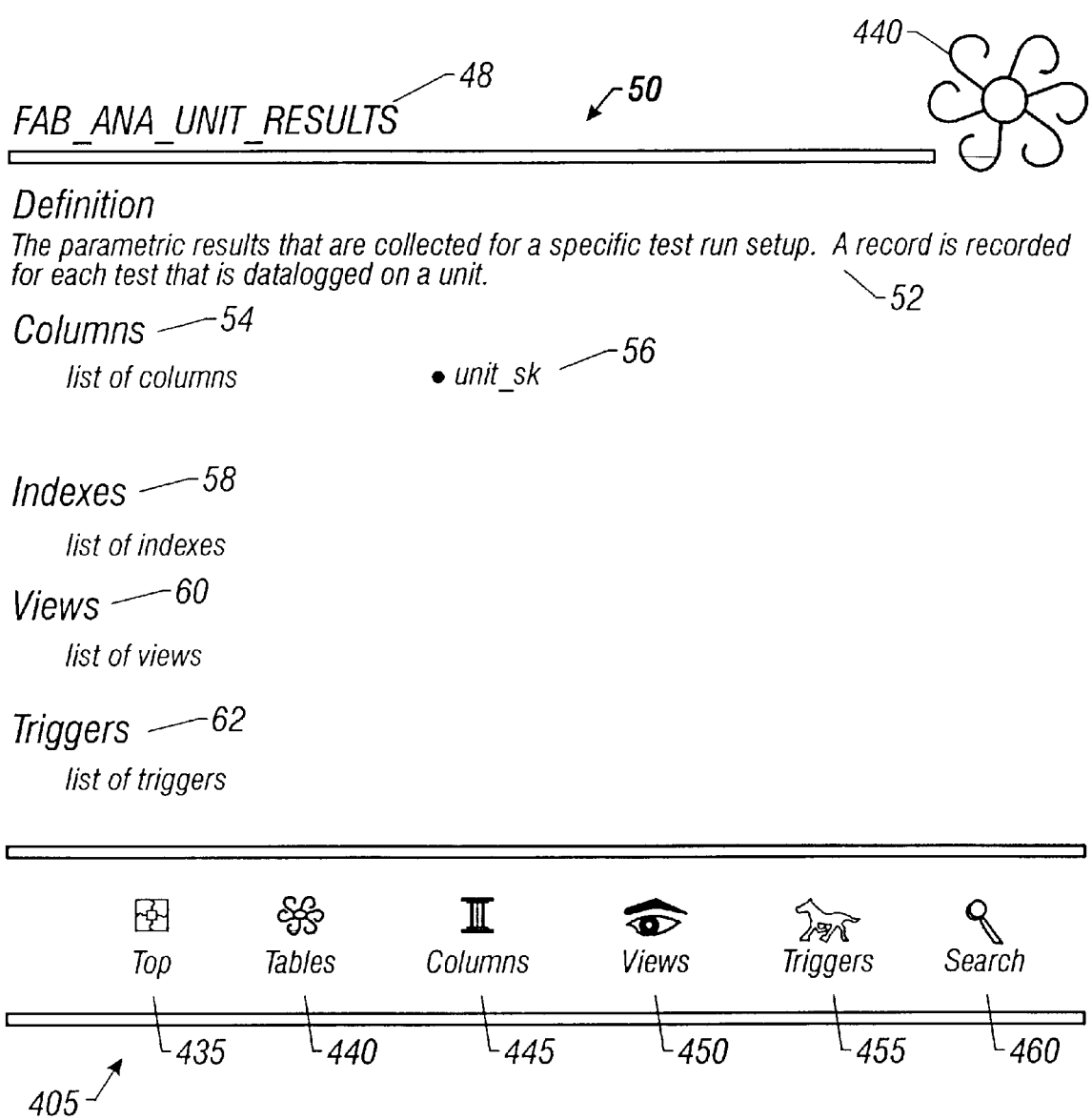
FIG. 14 is a plan view illustrating a documentation level including descriptions and definitions of a selected table from the Unit Level Fab sub-sub-level view of FIG. 13.

FIG. 14 is a plan view illustrating a documentation level 50 including descriptions and definitions of the selected table, the Fab_Ana_Unit_Results table 48, from the Unit Level Fab sub-sub-level view 25 on documentation level 40 of FIG. 13. The documentation level 50 illustrated in FIG. 14 is accessed by selecting and actuating the Fab_Ana_Unit_Results table 48 from the table listing 44 from the documentation level 40 displayed in FIG. 13. The Fab_Ana_Unit_Results table 48 documentation level 50 illustrated includes the definition 52 of the Fab_Ana_Unit_Results table 48, a list of columns 54 contained in the Fab_Ana_Unit_Results table 48 such as Unit_Surrogate Key ("sk") column 56, a list of indexes 58 describing fast access paths to the data contained in the Fab_Ana_Unit_Results table 48, a list of the views 60 of the database framework that include the Fab_Ana_Unit_Results table 48, and a list of trigger procedures 62 associated with the Fab_Ana_Unit_Results table 48. The user selectable items 405 described previously are also displayed on documentation level 50.

Figure 15:
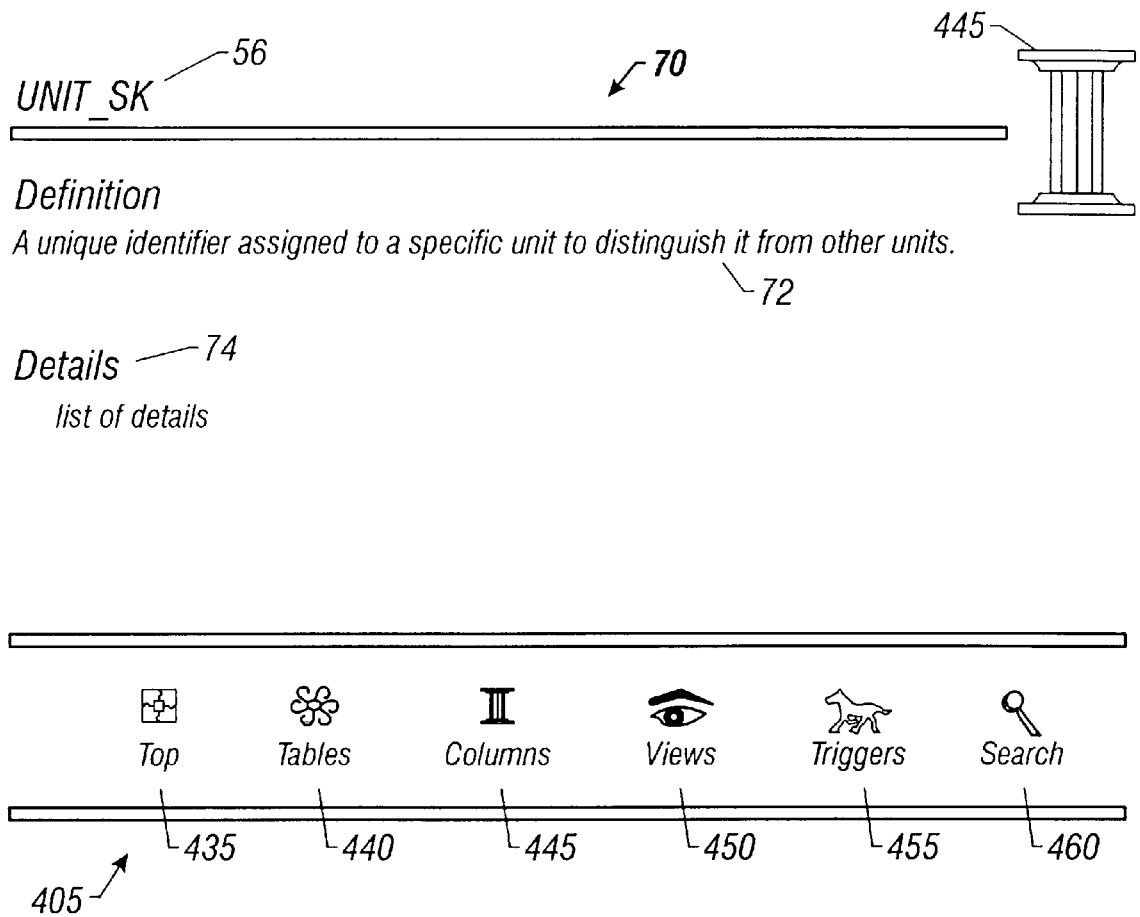
FIG. 15 is a plan view illustrating a documentation level including descriptions and definitions of a selected column from the table of FIG. 14.

FIG. 15 is a plan view illustrating a documentation level 70 including descriptions and definitions of the selected column, the Unit_Sk column 56, from the list of columns 54 of the Fab_Ana_Unit_Results table 48 of documentation level 50 of FIG. 14. The documentation level 70 illustrated in FIG. 15 is accessed by selecting and actuating the Unit_Sk column 56 from the list of columns 54 from the documentation level 50 displayed in FIG. 14. The Unit_Sk column 56 documentation level 70 illustrated includes the definition 72 of the Unit_Sk column 56, and a details list 74 describing all of the tables in the database which contain the Unit_Sk column 56. The user selectable items 405 described previously are also displayed on documentation level 70.

FIG. 16 is a plan view illustrating a documentation level 80 including all of the views of the engineering database framework from documentation level 400 of FIG. 4. The views documentation level 80 illustrated in FIG. 16 is accessed by selecting and actuating the eye metaphor 450 from the user selectable items 405 displayed on any documentation level. The eye metaphor 450 is the user selectable item representing all of the views of the engineering database framework. The views documentation level 80 is entitled, for example, as the "Table of Contents". The views documentation level 80 illustrated includes a views list 82 including all of the views of the engineering database framework in alphabetical order such as, for example, a list of all of the views beginning with the letter v, the v list 86, such as V_Bin_Eng_Brl view 88. The V_Bin_Eng_Brl view 88 includes definitions and descriptions of data related to lot level bin summary statistics. The user selectable items 405 described previously are also displayed with the views documentation level 80.

Figure 17:
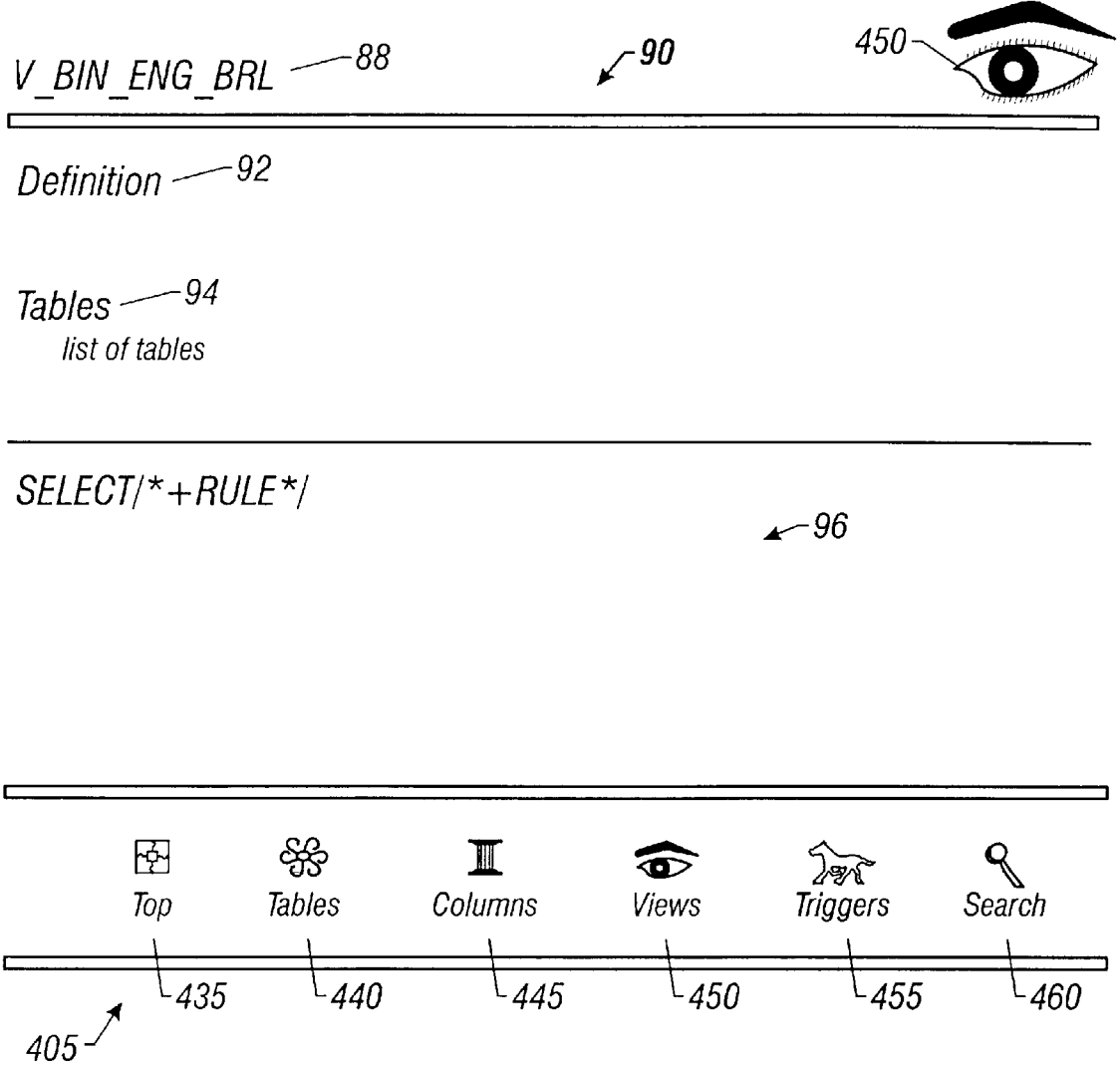
FIG. 17 is a plan view illustrating a documentation level including descriptions and definitions of a selected view of the engineering database framework from the views of the engineering database framework of FIG. 16.

FIG. 17 is a plan view illustrating a documentation level 90 including descriptions and definitions of the selected view, the V_Bin_Eng_Brl view 88, from the views documentation level 80 of FIG. 16. The documentation level 90 illustrated in FIG. 17 is accessed by selecting and actuating the V_Bin_Eng_Brl view 88 from the views list 82 on documentation level 80 displayed in FIG. 16. The V_Bin_Eng_Brl view 88 documentation level 90 illustrated includes a definition 92 of the V_Bin_Eng_Brl view 88, a listing of tables 94 contained in the V_Bin_Eng_Brl view 88, and a Structured Query Language Statement (SQL) statement 96 which constructs the V_Bin_Eng_Brl view 88 and includes commands used by the engineering database to implement the V_Bin_Eng_Brl view 88, for example, under a Select/*+Rule*/title, a listing of all of the tables from which the V_Bin_Eng_Brl view 88 is composed, and a description of how to link the tables. The user selectable items 405 described previously are also displayed with documentation level 90.

In the documentation levels illustrated in FIGS. 4 through 17, and in any documentation level as described in the present invention, the descriptions and definitions, including any part of the descriptions and definitions, can be user selectable items, which, when actuated, access other documentation levels. The logic flow and lining between the various documentation levels and the views of the database framework can flow in any direction, for example, to lower level detailed views and documentation level descriptions of the database such as sub-levels or sub-sub-levels, to higher level or broader views and documentation level descriptions of the database, or simply laterally from one view and/or documentation level to another.

The foregoing has described a methodology which provides an efficient and effective capability for interactively documenting a relational database framework and data contained in a relational database. The relational database is, for example, an engineering database related to the manufacturing and testing of semiconductor devices. The methodology provides for interactive documentation and review of large relational database frameworks wherein each individual user can easily review the specific information needed by that user, wherein the user may then more easily develop a query to obtain the actual data in the database. The documenting system also allows for efficient modification and updating of the database framework information including the entities, attributes and schema of the database.

Other embodiments are within the following claims and while only certain preferred features of the invention have been shown by way of illustration, many modifications and changes will occur. For example, while the preferred embodiment is set forth as software, it is anticipated that the invention could be implemented in hardware such as an application specific integrated circuit It is, therefore, to be understood that the present claims are intended to cover all such modifications and changes which fall within the true spirit of the invention.

What is claimed is:

1. A method for interactive documentation of a database framework and a data contained in a relational database, the method comprising:

providing a plurality of documentation levels, each documentation level including a view of the database framework and wherein atleast one documentation level includes a high level view of the database framework including atleast a process view, a structural view, an equipment and events view, an inline measurements view and an insertion views and wherein the documentation levels include descriptions and definitions of the views of the database framework and wherein the views of the database framework include descriptions and definitions of entities, attributes and schema of the data in the database;

displaying one of said documentation levels including the view of the database framework for said documentation level;

displaying, with each documentation level, one or more user selectable items wherein the user selectable items represent other documentation levels or other views of the database framework; and accessing said other documentation levels by actuating one of the user selectable items.

2. A method, as recited in claim 1, further comprising:

arranging one or more driving tables in the database wherein the plurality of documentation levels and the views of the database framework are based on said driving tables.

3. A method, as recited in claim 2, further comprising:

modifying the driving tables in the database thereby modifying the documentation levels and the views of the database framework.

4. A method, as recited in claim 1, wherein the user selectable items displayed with each documentation level are actuated in response to input from a user.

5. A method, as recited in claim 1, wherein the descriptions and the definitions, including parts of the descriptions and the definitions, of the views of the database framework included in the documentation levels are user selectable items.

6. A method, as recited in claim 1, wherein the descriptions and the definitions, including parts of the descriptions and the definitions, of the entities, the attributes and the schema of the data in the database included in the views of the database framework are user selectable items.

7. A method, as recited in claim 1, wherein one user selectable item represents trigger procedures within the database wherein the trigger procedures are implicitly executed sets of code executed when a particular statement is input from a user.

8. A method, as recited in claim 1, wherein one user selectable item represents a search function wherein particular key words or phrases occurring in the database framework are searched and displayed when the user selectable item representing the search function is actuated.

9. A method, as recited in claim 1, wherein one user selectable item represents tables in the database including definitions and descriptions of all tables in the database.

10. A method, as recited in claim 1, wherein one user selectable item represents columns including definitions and descriptions of all columns contained within all tables in the database.

11. A method, as recited in claim 1, wherein one user selectable item represents definitions and descriptions of all of the views of the database framework including tailored presentations of descriptions of the data contained in one or more tables in the database.

12. A method, as recited in claim 1, wherein the user selectable items are displayed as icons.

13. A method, as recited in claim 1, further comprising:

accessing a first documentation level from any other documentation level by actuating a particular user selectable item representing the first documentation level, wherein said first documentation level includes a top level view of the database framework.

14. A method, as recited in claim 1, the method further comprising:

displaying a puzzle metaphor when a first documentation level is accessed, said first documentation level including a top level view of the database framework, and wherein each puzzle piece of the puzzle metaphor is a user selectable item representing a high level view of the database framework.

15. A method, as recited in claim 14, further comprising:

accessing a description of a particular high level view of the database framework by actuating the puzzle piece representing that particular high level view of the database framework.

16. A method, as recited in claim 1, wherein the database is an engineering database having data related to the manufacturing and testing of semiconductor devices.

17. A method, as recited in claim 1, further comprising:

printing a hard copy of one or more of the documentation levels including the views of the database framework wherein the documentation levels and the views of the database framework are viewed by a user on said hard copy.

18. A method, as recited in claim 1, further comprising:

accessing a previously displayed documentation level by stepping back from a currently displayed documentation level wherein the stepping back is provided by actuating a step back function.

19. A method for interactive documentation of a database framework and a data contained in a relational engineering database in a computer system, the computer system including a processing unit coupled to a display device and wherein the data relates to the manufacturing and testing of semiconductor devices, the method comprising:

providing a plurality of documentation levels, each documentation level including a view of the engineering database framework and wherein at least one documentation level includes a high level view of the engineering database framework including atleast a process view, a structural view, an equipment and events view, an inline measurements view and an insertion views and wherein the documentation levels include descriptions and definitions of the views of the engineering database framework and wherein the views of the engineering database framework include descriptions and definitions of entities, attributes and schema of the data in the engineering database;

displaying on said display device, one of said documentation levels including the view of the engineering database framework for said documentation level;

displaying on said display device, with each documentation level, one or more user selectable items wherein the user selectable items represent other documentation levels or other views of the engineering database framework; and accessing said other documentation levels by actuating one of the user selectable items.

20. A method, as recited in claim 19, further comprising:

arranging one or more driving tables in the engineering database wherein the plurality of documentation levels and the views of the engineering database framework are based on said driving tables.

21. A method, as recited in claim 20, further comprising:

modifying the driving tables in the engineering database thereby modifying the documentation levels and the views of the engineering database framework.

22. A method, as recited in claim 19, wherein the user selectable items displayed with each documentation level are actuated in response to input from a user.

23. A method, as recited in claim 20, wherein the descriptions and the definitions, including parts of the descriptions and the definitions, of the views of the engineering database framework included in the documentation levels are user selectable items.

24. A method, as recited in claim 20, wherein the descriptions and the definitions, including parts of the descriptions and the definitions, of the entities, the attributes and the schema of the data in the engineering database included in the views of the engineering database framework are user selectable items.

25. A method, as recited in claim 19, wherein the computer system includes a graphical user interface, the method further comprising:
   displaying a puzzle metaphor on said display device when a first documentation level is accessed, said first documentation level including a top level view of the engineering database framework, and wherein each puzzle piece of the puzzle metaphor is a user selectable item representing a high level view of the engineering database framework.

26. A method, as recited in claim 25, further comprising:
   accessing a description of a particular high level view of the engineering database framework by actuating the puzzle piece representing that particular high level view of the engineering database framework.

27. A method, as recited in claim 19, wherein one high level view of the engineering database framework is a Process View and includes definitions and descriptions of processing or movement of data through a particular manufacturing facility from one or more shop floor execution systems and includes movement, loss comment, attribute and genealogy data descriptions.

28. A method, as recited in claim 19, wherein one high level view of the engineering database framework is a Structural View and includes definitions and descriptions of one or more manufactured products and the manufacturing steps and routes for each manufactured product.

29. A method, as recited in claim 19, wherein one high level view of the engineering database framework is an Equipment and Events View and includes definitions and descriptions of equipment, equipment configurations, equipment components, and equipment events.

30. A method, as recited in claim 19, wherein one high level view of the engineering database framework is an Inline Measurements View and includes definitions and descriptions of inline measurements and supporting data including limits, parameters and groupings of parameters for analysis.

31. A method, as recited in claim 19, wherein one high level view of the engineering database framework is an Insertion View and includes sub-level views of the database framework having definitions and descriptions of tester data, limit data and data related to binning and test programs, said sub-level views of the engineering database framework including a Lot Level sub-level view, a Run Level sub-level view, a Wafer Level sub-level view, and a Unit Level sub-level view.

32. A method, as recited in claim 31, wherein the Lot Level sub-level view includes definitions and descriptions of tables representing data contained in the unit level and summarized by test and bin.

33. A method, as recited in claim 31, wherein the Wafer Level sub-level view includes definitions and descriptions of tables related to wafer electrical testing and sorting data collection processes wherein said tables represent data from the unit level summarized by test and bin for each wafer.

34. A method, as recited in claim 31, wherein the Run Level sub-level view includes definitions and descriptions of tables related to backend data collection processes wherein said tables represent data from the unit level and bin summarized by test and bin for each run.

35. A method, as recited in claim 31, wherein the Unit Level sub-level view includes definitions and descriptions of tables representing detailed parametric data, including individual results of a single test on a single unit, and wherein the definitions and descriptions of the parametric data includes sub-sub-level views of the engineering database framework, said sub-sub-level views including a Unit Level Fab sub-sub-level view, a Unit Level Sort sub-sub-level view and a Unit Level Class sub-sub-level view.

36. A method, as recited in claim 35, wherein the Unit Level Fab sub-sub-level view includes definitions and descriptions of unit level data collected at a wafer electrical test step.

37. A method, as recited in claim 35, wherein the Unit Level Sort sub-sub-level view includes definitions and descriptions of unit level data collected during a sorting of wafers.

38. A method, as recited in claim 35, wherein the Unit Level Class sub-sub-level view includes definitions and descriptions of unit level data collected on assembled semiconductor parts.

39. A method, as recited in claim 19, wherein the computer system includes a graphical user interface and wherein the user selectable items are displayed as icons.

40. A method, as recited in claim 39, wherein one user selectable item is a horse metaphor representing trigger procedures within the engineering database wherein the trigger procedures are implicitly executed sets of code executed by the processing unit when a particular statement is input from a user.

41. A method, as recited in claim 39, wherein one user selectable item is a magnifying glass metaphor representing a search function wherein particular key words or phrases occurring in the database framework are searched and displayed when the user selectable item representing the search function is actuated.

42. A method, as recited in claim 39, wherein one user selectable item is a table metaphor representing definitions and descriptions of all tables in the engineering database.

43. A method, as recited in claim 39, wherein one user selectable item is a column metaphor representing definitions and descriptions of all columns continued within all tables in the engineering database.

44. A method, as recited in claim 39, wherein one user selectable item is an eye metaphor representing definitions and descriptions of all of the views of the engineering database framework including tailored presentations of descriptions of the data contained in one or more tables in the engineering database.

45. A method, as recited in claim 19, further comprising:
   accessing a first documentation level from any other documentation level by actuating a particular user selectable item representing the first documentation level, wherein said first documentation level includes a top level view of the engineering database framework.

46. A method, as recited in claim 19, further comprising:
   accessing a previously displayed documentation level by stepping back from a currently displayed documentation level wherein the stepping back is provided by actuating a step back function.

47. A method, as recited in claim 19, further comprising:
   printing a hard copy of one or more of the documentation levels including the views of the engineering database framework wherein the documentation levels and the views of the engineering database framework are viewed by a user on said hard copy.

48. A program product stored on a computer readable medium, executable by a processor for interactive documentation of a database framework and data contained in a relational database, comprising:

means for providing a plurality of documentation levels, each documentation level including a view of the database framework and wherein atleast one documentation level includes a high level view of the database framework including atleast a process view, a structural view, an equipment and events view, an inline measurements view and an insertion views and wherein the documentation levels include descriptions and definitions of the views of the database framework and wherein the views of the database framework include descriptions and definitions of entities, attributes and schema of the data in the database;

means for displaying one of said documentation levels including the view of the database framework for said documentation level;

means for displaying, with each documentation level, one or more user selectable items wherein the user selectable items represent other documentation levels or other views of the database framework; and means for accessing said other documentation levels by actuating one of the user selectable items.

49. A program product, as recited in claim 48, further comprising:

means for arranging one or more driving tables in the database wherein the plurality of documentation levels and the views of the database framework are based on said driving tables.

50. A program product, as recited in claim 49, further comprising:

means for modifying the driving tables in the database thereby modifying the documentation levels and the views of the database framework.

51. A program product, as recited in claim 48, wherein the user selectable items displayed with each documentation level are actuated in response to input from a user.

52. A program product, as recited in claim 50, wherein the descriptions and definitions, including parts of the descriptions and the definitions, of the views of the database framework included in the documentation levels are user selectable items.

53. A program product, as recited in claim 50, wherein the descriptions and the definitions, including parts of the descriptions and the definitions, of the entities, the attributes and the schema of the data in the database included in the views of the database framework are user selectable items.

54. A program product, as recited in claim 48, wherein one user selectable item represents trigger procedures within the database wherein the trigger procedures are implicitly executed sets of code executed by the processor when a particular statement is input from a user.

55. A program product, as recited in claim 48, wherein one user selectable item represents a search function wherein particular key words or phrases occurring in the database framework are searched and displayed when the user selectable item representing the search function is actuated.

56. A program product, as recited in claim 48, wherein one user selectable item represents tables in the database including definitions and descriptions of all tables in the database.

57. A program product, as recited in claim 48, wherein one user selectable item represents columns in the database including definitions and descriptions of all columns contained within all tables in the database.

58. A program product, as recited in claim 48, one user selectable item represents definitions and descriptions of all of the views of the database framework including tailored presentations of descriptions of the data contained in one or more tables in the database.

59. A program product, as recited in claim 48, wherein the user selectable items are displayed as icons.

60. A program product, as recited in claim 48, further comprising:

means for accessing a first documentation level from any other documentation level by actuating a particular user selectable item representing the first documentation level, wherein said first documentation level includes a top level view of the database framework.

61. A program product, as recited in claim 48, further comprising:

means for displaying a puzzle metaphor when a first documentation level is accessed, said first documentation level including a top level view of the database framework, and wherein each puzzle piece of the puzzle metaphor is a user selectable item representing a high level view of the database framework.

62. A program product, as recited in claim 61, further comprising:

means for accessing a description of a particular high level view of the database framework by actuating one of said puzzle pieces representing that particular high level view of the database framework.

63. A program product, as recited in claim 48, further comprising:

means for accessing a previously displayed documentation level by stepping back from a currently displayed documentation level wherein the stepping back is provided by actuating a step back function.

64. A program product, as recited in claim 48, further comprising:

means for printing a hard copy of one or more of the documentation levels including the views of the database framework wherein the documentation levels and the views of the database framework are viewed by a user on said hard copy.

65. A program product, as recited in claim 48, wherein the database is an engineering database having data related to the manufacturing and testing of semiconductor devices.

* * * * *